United States Patent [19]
Christie

[11] Patent Number: 5,599,098
[45] Date of Patent: Feb. 4, 1997

[54] EXTRUDER SCREW WITH MULTIPLE FLIGHTING

[75] Inventor: Andrew W. Christie, Fulton, N.Y.

[73] Assignee: The Black Clawson Company, Middletown, Ohio

[21] Appl. No.: 572,678

[22] Filed: Dec. 14, 1995

[51] Int. Cl.⁶ .................................................. B29B 1/06
[52] U.S. Cl. ............................................. 366/90; 366/322
[58] Field of Search .......................... 366/79, 80, 81, 366/88, 89, 90, 318, 319, 322, 323, 324; 425/207, 208, 209

[56] References Cited

U.S. PATENT DOCUMENTS

| | | | |
|---|---|---|---|
| 4,173,445 | 11/1979 | McKelvey et al. | 425/376 A |
| 4,280,802 | 7/1981 | Lang et al. | 425/208 |
| 4,310,484 | 1/1982 | Blakeslee, III | 264/176 R |
| 4,321,229 | 3/1982 | Blakeslee, III et al. | 264/349 |
| 4,350,657 | 9/1982 | Jones et al. | 264/349 |
| 4,357,291 | 11/1982 | Miller et al. | 264/176 R |
| 4,729,662 | 3/1988 | O'Brien | 366/79 |
| 4,746,220 | 5/1988 | Sukai et al. | 366/79 |
| 5,088,914 | 2/1992 | Brambilla | 425/208 |
| 5,219,590 | 6/1993 | Kruder et al. | 366/90 |

*Primary Examiner*—Robert W. Jenkins
*Attorney, Agent, or Firm*—Biebel & French

[57] ABSTRACT

A plastic materials screw has a metering section defined by a series of axially extending discontinuous and partially overlapping flightings. The flightings overlap each other by about a half to one turn to define overlapping portions whereby the flow in the primary channel is divided into a pair of secondary flow channels which have velocity profiles normal to the channel root greater than that in the primary channel. At the end of the overlapped portion, the first flighting is discontinued and the second flighting continues with a result that the flows are recombined in a distributive manner to provide improved mixing with a minimum of additional shear stress.

6 Claims, 1 Drawing Sheet

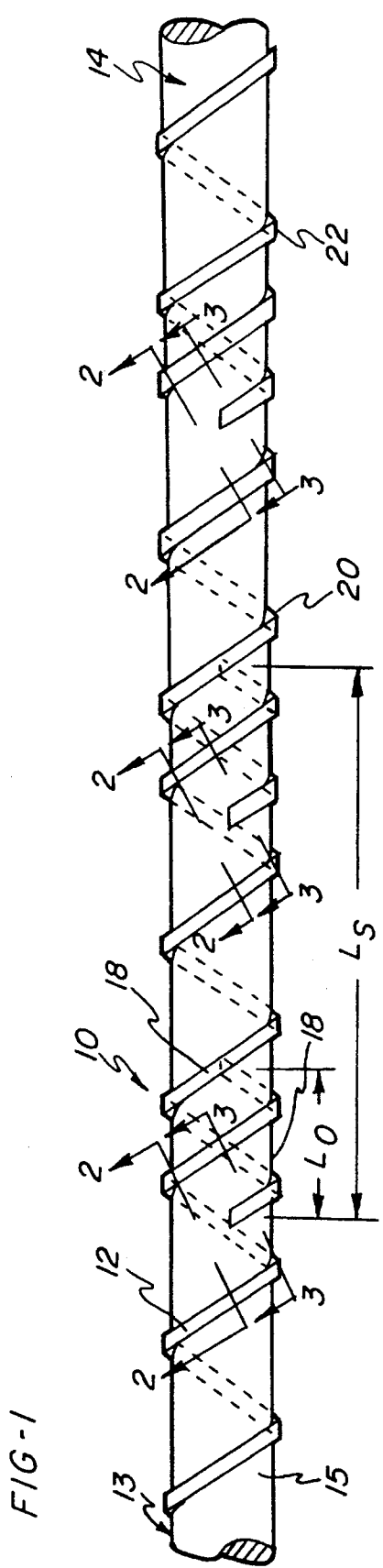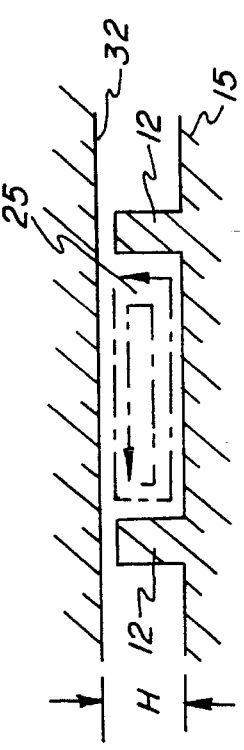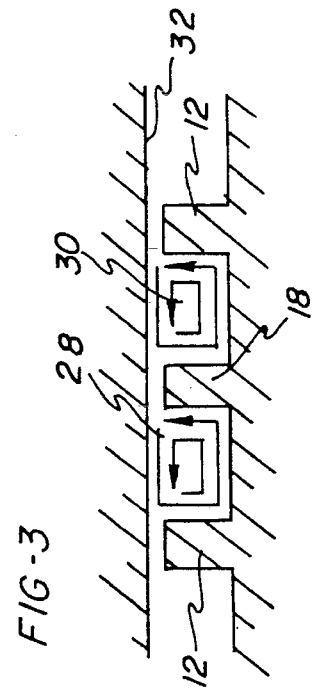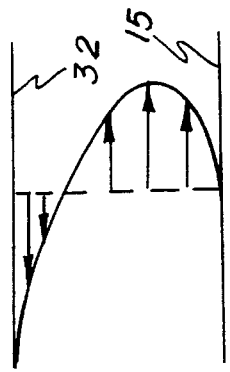

EXTRUDER SCREW WITH MULTIPLE FLIGHTING

BACKGROUND OF THE INVENTION

This invention pertains to an extruder screw for use in the barrel of a plastics material extruder, and is more particularly directed to the construction and design of the metering section of such a screw.

Typically, the metering section of the screw immediately follows a section in which the plastic material has been fully melted. Often, this section is called the "pressure section" since it is the region in which the molten material is stabilized in temperature, is further mixed, and is delivered under pressure, usually to a final mixing or kneading stage before exiting the barrel.

Mixing is an important task of a single screw extruder, the other tasks being conveying and melting. However,, mixing in such single extruders has always been a problem due to lack of uniformity and homogeneity in the melt.

The typical single flight single screw extruder inherently produces a non-uniform mix. This is because there is a large difference in the shear rate and the residence time in the outer and inner regions of the channel between the flighting. These result in a variation in the shear strain within the channel. The circular flow, both parallel to and normal to the screw, results in a shearing action in the outer portion which is counteracted by a shearing action in the inner portion, with locations in which the shear is zero. Such models lack elongational or extentional mixing and distributing mixing mechanisms, and therefore, complete mixing must depend upon the extent and efficiency of the customary final mixing stage.

Also, screw designs in the metering section have, commonly not adequately provided for a reduction or elimination of pressure fluctuations within this section. Flighting channels which vary in depth such as by tapering the core diameter, can, in some instances, produce a fluctuation in the rate of flow which, in turn, can be seen as a fluctuation at the output end of the screw.

SUMMARY OF THE INVENTION

This invention is direct to a screw design in which a plurality of flightings interact to divide the flow, and then recombine and then redivide and recombine the flow through a plurality of divisions. Simultaneously, at the regions of division, the flow is divided into two smaller channels which provide a higher shear stress within or along the channels as compared to that of the single channel.

Individual lengths or sections of flighting are partially overlapped to produce overlapping channels. The overlapped lengths extend for approximately one to one and a half flighting turns, at which point the next succeeding or secondary flighting becomes a primary flighting and delivers the melt to a further successive flighting in overlapping relation to the primary flighting. This may be repeated throughout the metering section, i.e., a division of flow from single channel to dual channel to single channel, in which the succeeding flighting then becomes the primary flighting which delivers the melt to second and subsequent divisions through regions of mutually overlapping flighting. In this manner, the flow is split and divided, and smaller overlapping channels are formed between the flights at the overlapping sections in which the fluid flow is accelerated both along the turns of the dual flighting and, rotationally within the respective channels, to be recombined into a single channel with accompanying deceleration. The polymer which was in the low shear center portion of the single channel is redistributed into the outer high shear areas of the dual channels. At each successive dual channel section the polymer on the trailing flank of the primary flighting is separated and exchanged to become immediately rearranged and positioned on the pushing flank of the new primary flighting. The modification of the shear mixing, accompanied by simultaneous distributive mixing during the acceleration and deceleration phases results in substantially improved overall mixing throughout the length of the metering section.

Throughout the metering section, it is preferred that the core diameter remain constant or relatively constant, i.e., the core is not tapered. This provides channels of substantially uniform depth along the metering section.

Accordingly, it is an important object of this invention to increase distributive mixing by providing a screw metering section with a plurality of partially inter-fitted or overlapping flightings which divide and recombine the flow defining between partially overlapping portions and conventional portions. The flow stream is divided from a single channel to parallel twin channels and then back to a single channel, in which the relative positions of the polymer in divided flows is reversed.

The resulting more complete mixing reduces temperature stratification in the melt thereby making temperature throughout the melt more uniform, with minimum additional shear energy input.

These and other objects and advantages of the invention will be apparent from the following description, the accompanying drawings and the appended claims.

BRIEF DESCRIPTION OF THE DRAWINGS

FIG. 1 is a schematic representation of the metering section of a single plastic extruder screw made according to this invention.

FIG. 2 is a fragmentary sectional view of the screw through a primary channel taken generally along the line 2—2 of FIG. 1;

FIG. 3 is another fragmentary sectional view showing the secondary channels and looking generally along the line 3—3 of FIG. 1;

FIG. 4 is a enlarged velocity profile in a primary channel corresponding to the channel illustrated in FIG. 2; and FIG. 5 is another enlarged velocity profile of one of the secondary channels corresponding to either one of the channels illustrated in FIG. 3.

DESCRIPTION OF THE PREFERRED EMBODIMENT

Referring to the figures of the drawing, which illustrate a preferred embodiment of the invention, a metering section of a screw, for delivering molten plastic material is illustrated generally at 10 in FIG. 1, beginning with a primary flighting 12 on a core 15. The inlet or beginning of the metering section is illustrated generally at 13, while the outlet end or forward of the metered section is illustrated at 14. A concept of this invention may be presented over a shorter or longer metering section within the scope of the invention. The inlet end 13 may be fed conventionally from a mixing or melt section of the screw or may be made according to copending applications (BKD 162 P2) filed concurrently herewith while the forward end 14 may feed a high shear mixer in accordance with the requirements of the material which may, as an example, be a final mixer of the type shown in U.S. Pat. No. 4,321,229.

The primary flighting as illustrated in FIG. 1 has a generally "square" pitch in that the lead spacing between adjacent flights is approximately equal to the diameter of the core 15. However, it is within the scope of this invention to have flighting of a varying angles which may be greater or lesser than the angles shown herein. Further, the radial height of the flighting, or alternatively the depth of the channels defined by the flighting, remains, in the preferred embodiment, constant throughout the length of the metering section.

The metering section of this invention is made up of a plurality of individual flighting segments which are arranged in a series of partially overlapping portions as represented in FIG. 1 by $L_o$. Thus, the flighting 12 may be considered as a first or primary flighting segment which extends axially along the length of the screw 10 for about 3 to 4 turns as represented by $L_s$. A forward end of flighting 12 is overlapped by about one half to one turn by a second flighting 18. In the overlapping zone or portion $L_o$ a double flight section is formed. The second flightings 18 also extends axially along the core about the same length as that of flighting 12, that is about three or four turns, and is then terminated. The forward end of the flighting 18 is in overlapping relation which a third flighting 20 and similarly, the third flight 20 has a forward end in overlapping relation with a fourth flighting 22, etc. There may be more or less than four flightings, as illustrated, and the overlapping extent between the first and the second, the second and the third, etc., may be varied one from the other, staying in the approximate range of one-half to one.

A primary channel 25, as illustrated in FIG. 2, is defined by the adjacent flanks of the flighting 12, the channel 25 is divided into two secondary channels 28 and 30, FIG. 3, fondled by the lead end portion of flighting 18, dividing the channel 25 into the two smaller channels, 28 and 30, which, together, have an effective volume less than the channel 25. In FIGS. 2 and 3 and in FIGS. 4 and 5, the screw barrel is represented at 32. The decrease in volume corresponds to the displacement of the flighting 18. This relationship holds true for the interaction between flightings 18 and 20, 20 and 22, etc. Throughout the metering section, the screw root or core 15 is of one-half to one turn.

Since the flow from the channel 25 is divided into two smaller channels, 28 and 30, and since the combined volumes of the channels 28 and 30 are less than the volume of channel 25, this transition is accompanied by a linear acceleration of the material which inherently causes additional distributive mixing. Additionally, it can be seen by comparing the cross channel velocity vectors profiles represented in FIGS. 4 and 5, that the velocity parallel to the screw root as well as the normal velocity vectors are increased substantially within the channels 28 and 30 over the corresponding velocity victors of the channel 25. This changes in velocity vectors also increases distributive mixing.

Thus, the flow from channel 25 is distributed into channels 28 and 30 and then recombine into channels defined by the non-overlapped portion of the respective flightings 18, 20, and 22 into wide channels as requested by channel 25. At each overlap section, that is the overlap between flightings 18 and 20, between flightings 20 and 22, etc., the flow in the primary channel is divided into secondary flows for approximately one turn and then recombined into a primary flighting.

The recombining of the separate flows results in further shear mixing and distributive mixing due to the interaction between the circulatory flows represented in FIG. 3 which combine to form a single flow in a combined channel, and the attendant decrease in the velocity vector along the channel due to the increase in channel volume (FIG. 4). Further, as previously explained, the relative positions of any two flows which are split in the secondary channels are reversed when the channels are recombined. That is to say, an element of polymer which was in the low shear center portion of the single channel becomes redistributed to the outer high shear areas of the dual channels. Following each successive dual channel section, an element of polymer on the trailing flank of one of the primary flights is separated and exchanged to become positioned on the pushing or forward facing flank of the next primary flight.

This interchange of polymer streams is, in itself, a division and mixing function which is accomplished with minimum additional shear strain and the mixing is increased at approximately the same shear strain as occurs in a conventional metering section. However, improved mixing is achieved by the periodic splitting and recombining of the flow, the disruption of conventional cross channel flow profiles, the change in overall velocity profiles and the resulting distributive mixing when these flows are periodically returned to a single flow status. Since the mixing is more complete, temperature stratifications in the melt tend to become reduced or eliminated.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A metering section of a plastics material extrusion screw comprising a series of axially extending, partially overlapping discontinuous single flightings, including at least a first flighting and a second flighting, each of said flightings defining a portion of the metering section in which said flighting are arranged in partially overlapping relationship whereby the single flow channel as defined by the first flighting is split into flow channel pairs at said portion in which said flightings are overlapped, and which flow channel pairs recombine as a single flow channel in the non-overlapped portion of the second flighting.

2. A metering section of a plastic materials screw comprising a series of discontinuous and partially overlapping flightings extending along the axial length of the metering section, including at least a first flighting defining between flights a primary channel and a second flighting, an end of the first flighting being overlapped by between about one half to one turn with a beginning of the second flighting to form throughout the overlapping portion, a pair of adjacent flow channels between the overlapped flightings in with said pairs of flow channels have velocity profiles which velocities normal to the channel roots greater than the velocity profiles in the primary channel to provide increased distributive mixing of the material in said channel pairs.

3. The screw of claim 2 in which the flight of said second flighting is positioned in said overlapping portion midway between the flights of said first flighting whereby the channels of said pair of channels are of equal volume.

4. The screw of claim 2 which further comprises a third flighting having a beginning in overlapped relation to an end of said second flighting.

5. The screw of claim 4 in which the non-overlapped portions of each of said flightings both exceed the axial length of any one of the said overlapped portions.

6. The screws of claim 2 in which the screw core is of constant diameter throughout said metering section.

* * * * *